United States Patent [19]

Solovjeva et al.

[11] Patent Number: 5,609,961
[45] Date of Patent: Mar. 11, 1997

[54] SINGLE-LAYER HIGH TEMPERATURE COATING ON A CERAMIC SUBSTRATE AND ITS PRODUCTION

[75] Inventors: Galina A. Solovjeva; Vladimir M. Tjurin; Stanislav S. Solntsev, all of Moscow, Russian Federation

[73] Assignees: Aerospatiale Societe Nationale Industrielle VIAM-, Paris, France; All Russian Institut of Aviation Materials, Moscow, Russian Federation

[21] Appl. No.: 610,935

[22] Filed: Mar. 5, 1996

Related U.S. Application Data

[62] Division of Ser. No. 404,918, Mar. 16, 1995, Pat. No. 5,518,778.

[30] Foreign Application Priority Data

Mar. 16, 1994 [FR] France .................................. 94 03050

[51] Int. Cl.$^6$ .......................................................... B32B 9/00
[52] U.S. Cl. .............................. 428/469; 501/12; 501/53; 501/98; 501/108; 501/117; 501/128
[58] Field of Search ...................... 501/12, 98, 53, 501/108, 117, 128; 428/640, 655, 469

[56] References Cited

U.S. PATENT DOCUMENTS

| | | | |
|---|---|---|---|
| 3,953,646 | 4/1976 | Fletcher et al. | 428/332 |
| 3,955,034 | 5/1976 | Fletcher et al. | 428/332 |
| 4,093,771 | 6/1978 | Goldstein et al. | 428/312 |
| 4,965,434 | 10/1990 | Nomura et al. | 392/407 |
| 4,973,495 | 11/1990 | Koike et al. | 427/68 |
| 5,164,003 | 11/1992 | Bosco et al. | 106/287.1 |
| 5,209,034 | 5/1993 | Box et al. | 52/171 |
| 5,324,457 | 6/1994 | Zhang et al. | 252/700 |

*Primary Examiner*—Benjamin Utech
*Attorney, Agent, or Firm*—Burns, Doane, Swecker & Mathis, L.L.P.

[57] ABSTRACT

The single-layer high temperature coating according to the invention, which is applied in particular on a porous substrate, comprises a high silica glaze gel frit, alumina and an emissivity agent consisting of $MoSi_2$ or $Cr_2O_3$, and has the following composition by weight:

gel frit: 45 to 55%;
$MoSi_2$ or $Cr_2O_3$: 25 to 50%;
$Al_2O_3$: 5 to 20%.

5 Claims, No Drawings

5,609,961

SINGLE-LAYER HIGH TEMPERATURE COATING ON A CERAMIC SUBSTRATE AND ITS PRODUCTION

This application is a divisional, of application Ser. No. 08/404,918, filed Mar. 16, 1995, now U.S. Pat. No. 5,518,778.

FIELD OF THE INVENTION

The invention relates to materials, and more precisely to coatings, for the protection of ceramic substrates, in particular porous ones, from erosion, and chemical and mechanical failure.

Refractory oxide based fibrous ceramic materials functioning at high temperatures are widely used. The conditions under which these materials are used place demands on the coatings used for their protection: high heat resistance, erosion resistance, thermochemical stability and phase stability.

BACKGROUND OF THE INVENTION

There is known at present a whole range of erosion resistant coatings which operate at temperatures of up to 1260° C. There is known a two-layer coating comprising a barrier layer and a glaze layer (see U.S. Pat. No. 3 953 646). The barrier layer is formed by a slip of fused silica comprising approximately 80 to 90% by weight of solid material. The coating is applied to the substrate by spraying. The barrier layer is fired at a temperature of approximately 930 to approximately 1370° C. The glaze layer, consisting of high silica glass, of borosilicate glass and of an emissivity agent, is applied to the barrier layer. The emissivity agent is selected from the group formed by silicon carbide, chromium, cobalt and nickel oxides, nickelchromium spinels, silicon nitride and calcined, mixed oxides of iron, chromium and/or nickel. High silica glass (Corning Glass No. 7913) contains not less than 94 weight % of $SiO_2$. The weight composition of the borosilicate glass (Corning Glass No. 7740) is as follows: 70 to 87% of $SiO_2$, 10 to 20% of $B_2O_3$, 2 to 5% of $Na_2O$ and 1 to 5% of $Al_2O_3$.

The high silica glass component and the borosilicate glass component are used in a weight ratio of approximately 3:1 to approximately 19:1, and the glass components (high silica glass and borosilicate glass) and the emissivity agent are used in a weight ratio ranging from 50:1 to approximately 4:1. An aqueous slurry containing from approximately 10 to approximately 90 weight % of glaze coating is fired at a temperature ranging from 930 to approximately 1370° C.

There is known in the art ( see U.S. Pat. No. 3 955 034) a three-component coating for silica insulation comprising a silica barrier layer, an emissivity layer comprising a high silica glass component and an emissivity agent selected from the group formed by silicon carbide, nickel oxide, chromium oxide, cobalt oxide, a nickel-chromium spinel, silicon nitride and calcined, mixed oxides of iron, chromium and cobalt, with a weight ratio of the high silica glass to the emissivity agent ranging from approximately 50:1 to approximately 4:1, and an overglaze coating layer of high silica glass and borosilicate glass in a weight ratio of high silica glass to borosilicate glass ranging from approximately 3:1 to approximately 19:1. The coating is fired at a temperature ranging from 930 to approximately 1370° C.

These coatings provide neither sufficient thermal shock resistance nor sufficient heat emissive stability, and they undergo a shrinkage.

To overcome the problems mentioned above, there has been proposed a one-layer coating (see U.S. Pat. No. 4 093 771) which is prepared by reacting a compound, selected from the group of substances formed by silicon tetraboride, silicon hexaboride, other boron silicides, boron and mixtures of these substances, with a reactive glass frit composed of high silica porous borosilicate glass and boron oxide. A thin layer of borosilicate glass is formed on finely divided particles of high silica glass, which improves the sintering of the coating without a substantial increase in the thermal expansion coefficient.

The reactive glass frit is advantageously prepared by blending approximately 2 to 10 parts by weight of boron oxide with 100 parts by weight of high silica porous borosilicate glass, such as Vycon®7930 glass. Vycon®7930 high silica borosilicate glass has a porosity of approximately 28%. The boron oxide is dissolved in 200 to 400 parts by weight of deionized water. The mixture is stirred at approximately 95° C., and then dried for a period of up to 24 hours, at a temperature of 75° to 95° C. The resulting glass frit is dispersed, screened and fired at 1150° C. for 1 hour. The resulting sintered composite is ground to a powder and screened.

A typical composition would be 97.5 weight % of reactive glass frit containing 5.5 weight % of boron oxide, combined with 2.5 weight % of silicon tetraboride composed of 63±3 weight % of silicon, 36±3 weight % of boron and less than 0.2 weight % of magnesium. The coating slurry is prepared by blending finely divided particles of reactive glass frit and silicon tetraboride, with a carrier such as ethanol and a pre-binder such as methylcellulose, in a proportion by weight of solid components of 35 to 50%. The mixture of coating components is milled in an alumina ball mill with alumina balls for 3 to 12 hours. The coating is applied by spraying. The coated samples are dried for 2 to 5 hours at temperatures in the range of 20 to approximately 70° C. After drying, the coated samples are glazed in an oven for 1.5 hours at 1215° C. The coating has an emissivity of approximately 0.90 to 0.93 from ambient temperature to over 1260° C. The thermal expansion coefficient is $1.1 \cdot 10^{-6}$ $K^{-1}$.

There is also known an advanced low density coating for the protection of aluminosilicate porous materials that has an operating temperature of up to 1300° C. The composition of the coating comprises 77.5 weight % of reactive glass frit, 2.5 weight % of silicon tetraboride and 20 weight % of molybdenum disilicide. The coating is formed on the substrate at 1230° C. for 1.5 hours (see: Advanced Porous Coating for low density Ceramic Insulation Materials, J. Amer. Ceram. Soc., vol. 72, No. 6, pages 1003–1010, 1989).

There is further known a coating on an insulating ceramic material comprising 80 to 95 weight % of aluminosilicate glass and 5 to 20 weight % of aluminum oxide. This coating is formed using slurry coating and firing techniques. It is fired at temperatures ranging from 1300° to 1350° C. for 5 to 15 minutes. At temperatures of up to 1300° C., the coating has low erosion resistance and tends to crack [see Inventor's Certificate SU 1 331 846 (classification: C 03 c 8/24) filed on 21st. Jun. 1985, published on 23rd. Aug. 1987 (Bulletin No. 31) and entitled "Coating Composition"].

Known coating compositions are used for the protection of porous ceramic materials having operating temperatures of 1260° C. to 1350° C. At present, ceramic materials with operating temperatures of up to 1500° C. are a matter of interest for specialists. Known coating compositions are not efficient at these temperatures: the coatings obtained are crystallised and cracked.

SUMMARY OF THE INVENTION

According to one of its aspects, the invention provides a single-layer, high temperature coating on a ceramic substrate, in particular a porous one, characterized in that it comprises a high silica glaze gel frit, alumina and an emissivity agent consisting of $MoSi_2$ or $Cr_2O_3$, and has the following weight composition:

gel frit: 45 to 55%;

$MoSi_2$ or $Cr_2O_3$: 25 to 50%;

$Al_2O_3$: 5 to 20%.

The ceramic material used as a substrate generally comprises one or more compounds selected from the group formed by $Al_2O_3$, $SiO_2$, $ZrO_2$, $SiC$ and $Si_3N_4$.

The high silica glaze gel frit is prepared using a sol-gel technology and is preferably of the following weight composition:

$SiO_2$: 88 to 98%;

$B_2O_3$: 2 to 12%.

The $Fe_2O_3$ content and the $Na_2O$ content of the gel frit generally range from approximately $1 \cdot 10^{-4}$ to approximately $1 \cdot 10^{-5}$ weight %.

These $Fe_2O_3$ and $Na_2O$ contents entering into the composition of the gel frit ensure that it has a high softening temperature and low crystallability, which enables the gel frit to be used as a matrix for a coating having an operating temperature of up to 1500° C.

The use of less than 45 weight % of gel frit has the result of lowering the softening temperature and the thermal shock resistance of the coating.

A coating comprising more than 55 weight % of gel frit does not ensure sufficient emissivity.

The use of alumina ($Al_2O_3$) increases the heat resistance of the coating.

The use of $MoSi_2$ or $Cr_2O_3$ results in high emissivity at a temperature of 1500° C. Moreover, the addition of these components to a coating composition has the effect of increasing the thermal expansion coefficient and reducing the residual strain in the coating, which makes it possible to improve its heat resistance. The use of over 50 weight % of these additives has the effect of reducing resistance of the coating to thermal shocks, and the use of less than 25 weight % of these additives has the effect of reducing the emissivity of the coating.

Advantageously, the emissivity agent content in particles having a size of less than 5 μm ranges from approximately 60 to approximately 80 weight % of this agent. If the emissivity agent content in particles having a size of less than 5 μm is over 80 weight % or less than 60 weight %, the agent is randomly distributed through the glass matrix, which results in a drop in the heat resistance of the coating.

Penetration of the substrate, in particular a porous one, by the coating imparts high adhesion.

In general a densified layer having a thickness of 70 to 140 μm and maximum density of 800 kg/m$^3$ (0.8 g/cm$^3$) is formed on the substrate. The coating is applied to the substrate by spraying, using compressed air, advantageously at a pressure of $0.8 \cdot 10^5$ to $1.1 \cdot 10^5$ Pa (0.8 to 1.1 atm).

The weight ratio of the suspension phase (coating powder) to the dispersion medium (preferably distilled water) is from 1:1 to 1:5. A high content in terms of dispersion medium, particularly water, results in the chemical composition of the coating being non-uniform, while a low content for this medium leads to reduced adhesion between the coating and the substrate.

The coating is applied to the surface of the substrate, prepared in advance by dedusting the felt forming the substrate so as to obtain better adhesion.

According to another of its aspects, the invention thus relates to a process for providing a ceramic substrate, in particular a porous one, with a coating as defined hereabove, characterized in that it essentially comprises the steps of:

preparing a slurry from a powder consisting of 45 to 55 weight % of high silica glaze gel frit, 25 to 50 weight % of emissivity agent, $MoSi_2$ or $Cr_2O_3$ and 5 to 20 weight % of alumina, in a compatible dispersion medium, preferably distilled water, with a weight ratio of powder to dispersion medium of from 1:1 to 1:5;

applying this slurry, by spraying under pressure, to the ceramic substrate to be coated, which has undergone a preparatory treatment;

drying the layer thus obtained and firing it at a temperature of 1300° to 1500° C., for 15 to 90 minutes.

Drying is generally carried out at approximately 20° C. for approximately 30 minutes, and then at a temperature of 80° to 100° C. for approximately 2 hours.

The following examples are intended to illustrate and more clearly explain the invention.

EXAMPLE 1

A coating was prepared using slurry coating and firing techniques.

The gel frit used was milled in an alumina mill with alumina balls for 25 hours, to obtain a powder having a specific surface of 1 m$^2$/g, and screened. $MoSi_2$ powder was milled in a metallic mill with metallic balls containing isopropyl alcohol for 30 hours, and then screened.

45 parts by weight of frit (comprising 88 weight % of $SiO_2$ and $1.10^{-4}$ weight % of $Fe_2O_3$ and $Na_2O$), 50 parts by weight of $MoSi_2$ (comprising 65 weight % of particles having a size of less than 5 μm) and 5 parts by weight of $Al_2O_3$ were mixed in a polyethylene vessel for 40 hours.

A weighed quantity of powder was diluted with distilled water in a weight ratio of 1:2. The coating was applied by spraying, at an air pressure of $0.8 \cdot 10^5$ Pa (0.8 atm), on the surface prepared in advance, by dedusting, to receive a coating of an $Al_2O_3$ based material. A 70 μm thick densified layer was formed. The coating was air dried at 20° C. for 30 minutes, and then oven dried at 80° C. for 2 hours. The coating was fired at 1300° C. for 90 minutes.

EXAMPLE 2

A coating comprising 45 parts by weight of high silica gel frit containing 12 weight % of $B_2O_3$, 50 parts by weight of $Cr_2O_3$ and 5 parts by weight of $Al_2O_3$ was applied, using the process according to Example 1, to a $ZrO_2$ based substrate. The powder:water weight ratio was 1:5, and the air pressure was $1.1 \cdot 10^5$ Pa (1.1, atm). A 140 μm thick densified layer was deposited.

EXAMPLE 3

A coating comprising 55 parts by weight of high silica gel frit (containing 98 weight % of $SiO_2$ and $1.10^{-5}$ weight % of $Fe_2O_3$, $Na_2O$), 30 parts by weight of $MoSi_2$ (containing 75 weight % of particles having a size of less than 5 μm) and 15 parts by weight of $Al_2O_3$ was applied, according to the process of Example 1, to an $SiO_2$ based substrate. The powder:water weight ratio was 1:3, and the air pressure was $1.10^5$ Pa (1 atm). A 100 μm thick densified layer was deposited on the substrate. The coating was fired at a temperature of 1500° C. for 15 minutes.

RESULTS:

The coating compositions obtained were subjected to a heat resistance test over a temperature range of 20° C.⇆1500° C.⇆20° C. for 30 minutes. The number of cycles was 2 The thermal expansion coefficient was $2.3 \cdot 10^{-6}$ $K^{-1}$, and the emissivity was not less than 0.86.

We claim:

1. A single-layer, high temperature coating composition, said coating composition comprising 45 to 55% by weight of a frit made from a high silica gel, 5 to 20% by weight of alumina, and 25 to 50% by weight of an emissitivity agent selected from $MoSi_2$ and $Cr_2O_3$.

2. The coating composition according to claim 1, which is applied on a porous substrate.

3. The coating composition according to claim 1, wherein the frit comprises 88 to 98% by weight of $SiO_2$ and 2 to 12% by weight of $B_2O_3$.

4. The coating composition according to claim 1, wherein the frit comprises from approximately $1 \cdot 10^{-4}$ to approximately $1 \cdot 10^{-5}$ weight % of $Fe_2O_3$ and from approximately $1 \cdot 10^{10-4}$ to approximately $1 \cdot 10^{-5}$ weight % of $Na_2O$.

5. The coating composition according to claim 1, wherein said coating composition is a densified layer having a thickness of 70 to 140 μm and a maximum density of 0.8 g/cm$^3$.

* * * * *

UNITED STATES PATENT AND TRADEMARK OFFICE
CERTIFICATE OF CORRECTION

PATENT NO.   :   5,609,961

DATED   :   March 11, 1997

INVENTOR(S)   :   Galina A. SOLOVJEVA et al.

It is certified that error appears in the above-identified patent and that said Letters Patent is hereby corrected as shown below:

On the Title Page:

[73] Assignees, please delete "Aerospatiale Societe Nationale Industrielle VIAM, Paris, France; All Russian Institut of Aviation Materials, Moscow, Russian Federation" and insert therefor --Aerospatiale Societe Nationale Industrielle, Paris, France; VIAM - All Russian Institute of Aviation Materials, Moscow, Russian Federation--;

Column 2, line 40, please delete "$1.1 \cdot \cdot 10^{-6}$" and insert therefor --$1.1 \cdot 10^{-6}$--;

Column 4, line 53 (Example 2), please delete "$1.1 \cdot \cdot 10^{-5}$" and insert therefor --$1.1 \cdot 10^{-5}$--.

Column 4, line 53, please delete "(1.1, atm)" and insert therefor --(1.1 atm)--; and

UNITED STATES PATENT AND TRADEMARK OFFICE
CERTIFICATE OF CORRECTION

PATENT NO. : 5,609,961
DATED : March 11, 1997
INVENTOR(S) : Galina A. SOLOVJEVA et al.

It is certified that error appears in the above-indentified patent and that said Letters Patent is hereby corrected as shown below:

Column 6, line 7 (claim 4, line 4) please delete "$1 \cdot 10^{10-4}$" and insert therefor --$1 \cdot 10^{-4}$--.

Signed and Sealed this

First Day of July, 1997

Attest:

BRUCE LEHMAN

Attesting Officer       Commissioner of Patents and Trademarks